Figure 8:
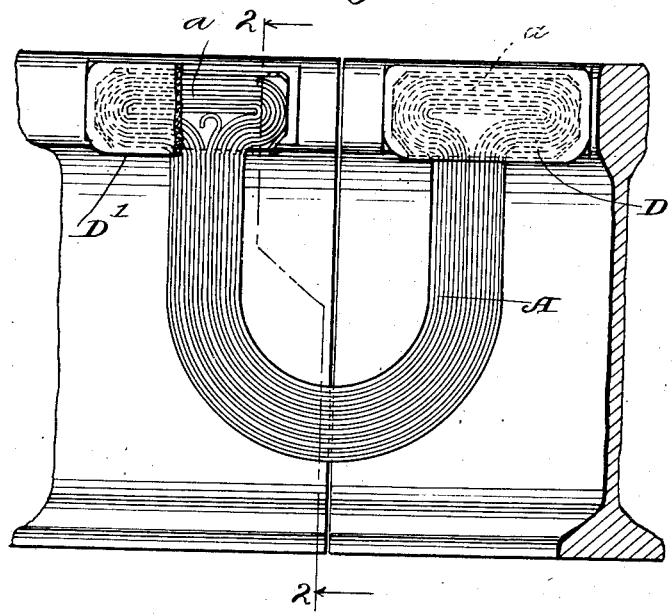

A. B. HERRICK.
METHOD OF MAKING HOMOGENEOUS MECHANICAL JUNCTURES.
APPLICATION FILED JUNE 4, 1909. RENEWED JUNE 8, 1912.
1,046,464.
Patented Dec. 10, 1912.
3 SHEETS—SHEET 1.
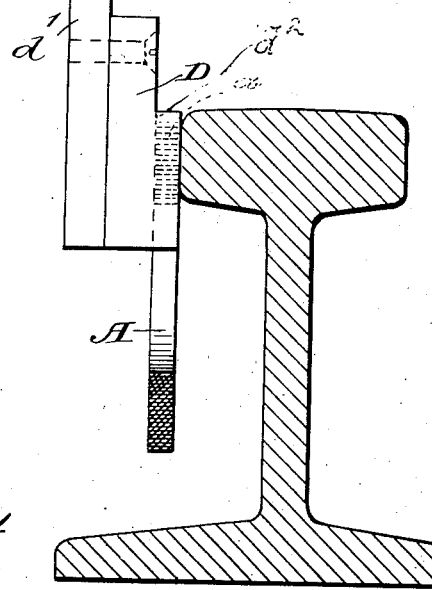

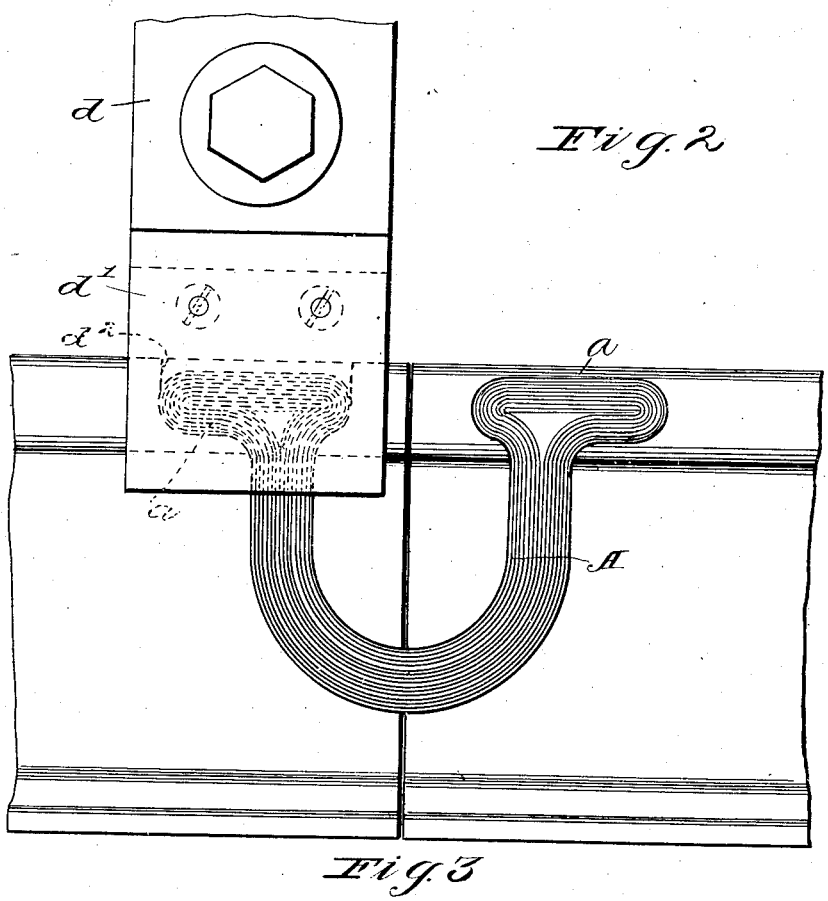
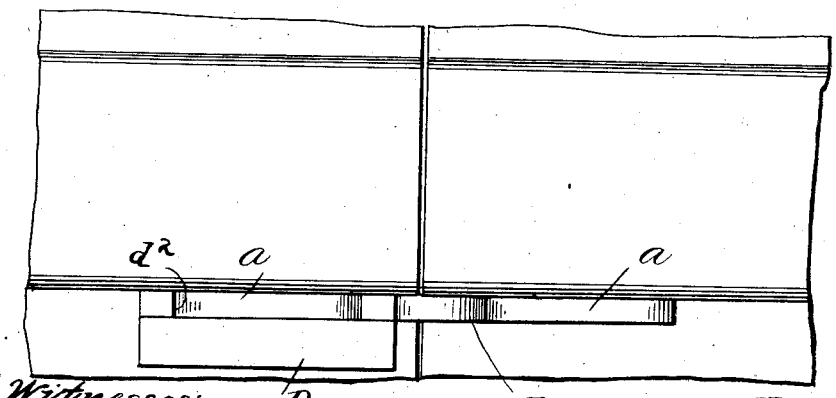

A. B. HERRICK.
METHOD OF MAKING HOMOGENEOUS MECHANICAL JUNCTURES.
APPLICATION FILED JUNE 4, 1909. RENEWED JUNE 8, 1912.

1,046,464.

Patented Dec. 10, 1912.

3 SHEETS—SHEET 3.

Witnesses:
J. C. Turner
Jno. F. Oberlin

Inventor:
Albert B. Herrick
by J. B. Fay
Attorney.

UNITED STATES PATENT OFFICE.

ALBERT B. HERRICK, OF NEW YORK, N. Y., ASSIGNOR TO THE ELECTRIC RAILWAY IMPROVEMENT CO., OF CLEVELAND, OHIO, A CORPORATION OF OHIO.

METHOD OF MAKING HOMOGENEOUS MECHANICAL JUNCTURES.

1,046,464.  Specification of Letters Patent.  Patented Dec. 10, 1912.

Application filed June 4, 1909, Serial No. 500,130. Renewed June 8, 1912. Serial No. 702,617.

*To all whom it may concern:*

Be it known that I, ALBERT B. HERRICK, a citizen of the United States, and a resident of New York city, county of New York, and State of New York, have invented a new and useful Improvement in Methods of Making Homogeneous Mechanical Junctures, of which the following is a specification, the principle of the invention being herein explained and the best mode in which I have contemplated applying that principle, so as to distinguish it from other inventions.

The invention relates to a method of making homogeneous mechanical junctures between two metallic bodies, and particularly to the joining together of copper bonds and steel rails, so as to bring the electrical conductivity of the abutting rails up to the required degree.

The object of the invention is to provide such a "bonding" process that may be carried on in a rapid and efficient manner.

To the accomplishment of this and related ends, said invention consists of the steps hereinafter fully described and particularly set forth in the claims.

The general process of making a homogeneous mechanical juncture, of which the present process is one specific aspect, is fully described and claimed in my co-pending application filed November 25, 1904, Serial No. 234,161. The present process may be regarded as being, in a sense, the adaptation of such general process to the application of a bond having the particular construction described and claimed in yet another co-pending application filed April 19, 1905, Serial No. 256,439; although it is not intended by this reference to imply that such process is limited to use with a particular kind of bond. As a matter of fact, the contrary is quite the case, as the sequel will show. The general process of which the one in hand is thus a specific aspect, is to be distinguished from processes of soldering bonds to rails, whether by electrical or other means, for by a homogeneous mechanical juncture I mean to designate a union between the metals more intimate than that secured at the low temperature at which solder will melt. In other words, by my present method, or process, I am enabled to obtain a true welded joint between the copper of the bond and the steel of the rail, while at the same time the ease of operation is such that the welding may be carried on at a much increased rate of speed.

The annexed drawings and the following description set forth in detail certain steps embodying the principle of the invention, the disclosed method, however, being but one of various ways in which the principle of my invention may be employed.

Figure 9:
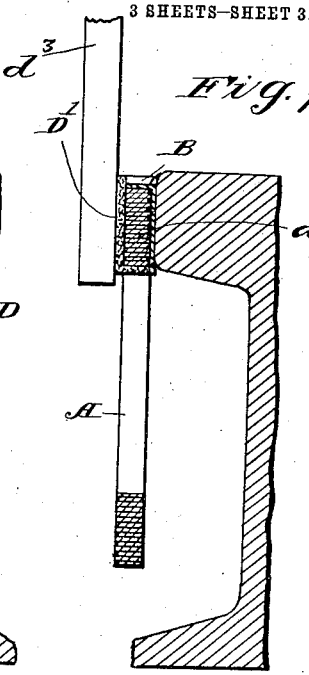
Figure 10:
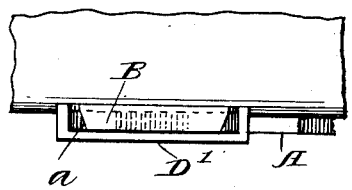
Figure 11:
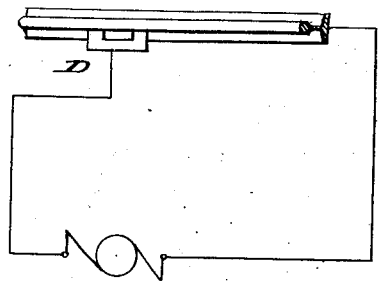
Figure 12:
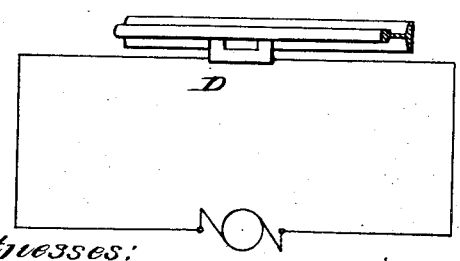

In said annexed drawings:—Figure 1 represents a vertical transverse cross-section of a standard steel rail and a bond applied thereto and in position for the bonding process; in this figure I have also illustrated a portion of one typical device for holding the bond in place and for providing the external source of heat required for carrying out the process. Fig. 2 represents a front elevation of one of the bonds used in this process, such heating device being illustrated in similar position to that shown in Fig. 1 with respect to one terminal or head of the bond, while the other head of such bond is represented as already affixed or welded to the corresponding rail. Fig. 3 is a plan view, with portions broken away, of bond, rail and heating device in the same relation as that illustrated in Fig. 2; Figs. 4, 5, 6 and 7 illustrate the carbon electrode that forms such external source of heat when current is properly supplied thereto, said electrode appearing in variously modified form, adapting it to the welding of bonds of different types onto the rail. Fig. 8 is a side elevational view of the adjacent ends of two abutting rails, showing a rail bond of the construction described in my co-pending application, Serial No. 256,439, above referred to, as being employed in the carrying out of the present process. Fig. 9 is a vertical cross section of such rail and bond with other appurtenant parts employed in the carrying on of the process. Fig. 10 represents a plan of one of the bond terminals in contact with the side of the rail which is the place it occupies in the carrying out of the process. And Figs. 11 and 12 respectively show two different arrangements of circuit for the carrying on of my improved process.

The bond A which I preferably use in either of the two arrangements of apparatus illustrated in Figs. 1, 2, and 3, and Figs.

8, 9, and 10 respectively, is of the same general character, being formed of laminations of copper ribbon of suitable dimensions, and the whole being given a general U-shaped form with widened terminals a. It is not meant, however, to imply that the process is in any sense limited to the utilization of bonds of this particular form or construction, but, as indicated in Figs. 4 to 7, inclusive, the conformation and disposition of the terminals may present considerable diversity; so too, is it a matter of indifference whether the body of the bond be composed of laminations as has just been described, or consist of a small rod, or of strands gathered together as in the familiar cable construction of bond.

A preliminary step in the carrying on of the process is to cleanse the lateral surfaces of the abutting rails, to which it is intended to apply the bond, by removing therefrom the scale and rust which might detract from the formation of a perfect union. This is preferably done by grinding or chiseling, which operation may be carried on by any suitable mechanism. It is furthermore a matter of indifference how deep the surface be removed, merely such superficial impurities may be removed, or, as illustrated in Figs. 8, 9 and 10, the face of the rail may be cut into so as to form a shallow recess, the surface of which presents bright, clean metal. The terminals of the bond are then applied to such surface, being placed in position by hand or by means of a suitable holder; and thereupon the heating device is caused to press upon the outer surface of such terminals, either one at a time as shown, or both together, as found most convenient. It is to the construction of this heating device, and to the modification in the general effect obtained thereby, that attention is desired in the present connection. Of such heating device, two illustrative forms are shown, and these will now be taken up in their order, that illustrated in Figs. 1 to 7 inclusive being considered first.

Of the heating device, only such parts are shown as are directly associated in the bonding operation, such parts consisting of a movable member $d$, a holder $d'$, removably clamped to the lower end of said member; and a block D of high resistance material, preferably carbon, affixed to said holder. As described in my earlier application relating to the general process exemplified herein, such carbon block is designed merely to contact with the outer face of the bond terminal. In the present construction, as will clearly appear from an inspection of the series of figures just named, the face of said block is recessed, the recess $d^2$ being given a form to correspond with that of the bond terminal so as to fit more or less snugly around the same when the latter is applied to the rail as just described. Said block thus not only contacts with the outer face of the bond terminal, but also with points on the face of the rail, laterally contiguous to the portion of such face with which said bond terminal contacts. A suitable source of electricity being provided for passing a current through a circuit including said carbon, the latter may be raised to any desired degree of temperature, owing to the resistance interposed by the material of which it is made to the passage of such current therethrough. The circuit for thus passing a current through said carbon, may be arranged either as in Fig. 11, wherein the bond and rail form a portion of the circuit, or as in Fig. 12, where the carbon block or electrode alone of the parts under consideration is included in such circuit. Current being thus turned on until the carbon block becomes highly heated, such heat will be transmitted by conduction through the bond to the contacting face of the rail, which face is at the same time additionally heated by conduction from those portions laterally contiguous thereto, wherewith the block comes into direct contact. As a result, such contacting rail face becomes heated and softened to a sufficient extent to form a homogeneous union or weld with the copper of the bond terminal. Since the latter is practically inclosed by the surrounding portions of the carbon block, forming as it were a mold, it is not necessary to guard as carefully against the consequences of complete fusion of the terminal or portions of such terminal as in the case where a flat electrode is pressed against the outer face of the terminal leaving its edges wholly exposed. However, it is not contemplated that it will be necessary to prolong the application of heat or make it of such a degree as to thus completely fuse the terminal any more than in the other specific aspect of my general process.

As just described, I have made no reference to the use of any fluxing material between the bond and rail face, nor is it necessary to the carrying out of my improved process, that such material be employed. The welding operation, however, is facilitated by the use of a flux as the familiar borax, and if desired, in addition to this material a strip of brass or bronze may be introduced, since I have found that owing to the fusion of such strip at an early stage of the operation, by reason of its lower temperature of fusion, a body is introduced between the bond and rail which will be a good conductor of heat as well as of electricity; while at the same time, owing to the liquid state which it assumes, such body is admirably adapted to cover the juxtaposed faces of the bond and rail, so as to protect them during the subsequent stage of the operation, while the bond and rail face are being brought to a welding temperature.

In the form of apparatus illustrated in Figs. 8, 9 and 10, I do illustrate a sheet B of brass or bronze as being attached mechanically or otherwise to the bond terminal for the purpose just referred to. The more important modification, however, in the apparatus for the carrying out of my process illustrated in said figures, is the incorporation of the high resistance electrode or block of carbon here designated D' into the bond structure. Such electrode is preferably formed by preparing the carbon in suitable plastic form, and then molding the same upon the terminal so as to substantially inclose the latter with the exception of its inner face, to which the sheet B of brass is affixed and which is designed to contact with the rail. In other words, in applying such material, it is caused to overlap the terminal upon the bottom and sides as shown, so as to form a mold or matrix for the head. This carbon material is thus seen to form a part of the complete bond. The top of the terminal is preferably left free, so that if necessary borax or like fluxing material or additional brass may be introduced if desired between the bond and the rail. In this construction of the apparatus, the current is preferably passed through not only the electrode, but also the two bodies to be welded together, electrical connection with the block D' being had through a movable member $d^3$ corresponding with the arm $d'$ of the apparatus first described.

Regarding the process in its general aspect it will be seen that the carbon block, in either of its two illustrated forms D or D', constitutes simply an external heat source whereby heat may be applied to or concentrated upon the bond. The latter then conducts the heat thus received to the portion of the rail that it is desired immediately to affect and being of a character such as to permit this conduction at a very rapid rate, more rapidly, in other words, than the heat can be dissipated through the rail, I find that the contacting superficies are raised practically simultaneously to the required welding temperature. At the same time, by the present modification of the process, heat is applied directly to points on the face of the rail laterally contiguous to the portion of such face thus affected by heat conducted through the bond. An augmented heating effect is thus obtained, while still retaining the advantages arising from having the heat concentrated and accurately directed toward the portions that require to be raised to a welding temperature and no others. In other words, the loss of time and waste of energy that would be incidental to raising to such temperature the entire section of rail adjacent to the portion to be bonded, are avoided. By reason, moreover, of the high welding temperature of copper and steel and the rapid conduction of heat by the rail, the pressure may be relieved practically simultaneously with the turning off of the current and a satisfactory joint produced. This feature, it will hence be seen, facilitates the operation by dispensing with the prolonged application of the pressure after the current is turned off, such prolonged pressure being a necessary feature not merely of the Thomson process, but so far as I am aware, of all the modifications of this process heretofore attempted.

In conclusion it should be noted that in general I herein refer to the juxtaposed or contiguous faces of the bond and rail at the desired point of union as the contacting faces. This is simply for uniformity in expression, and does not of necessity imply that the faces in question are literally in contact, especially not at the beginning of the operation nor where a sheet of brass or bronze is interposed, as may be the case, irrespective of which of the two arrangements of electric circuit for carrying out the process be adopted. Where such brass or bronze is employed, it will hence be understood, unless expressly stated to the contrary, to constitute in effect a part of the bond, being preferably more or less permanently secured thereto, as in the case of the bond hereinbefore described.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The method of homogeneously uniting metal bodies having unlike heat conductivities, which consists in holding said bodies in contact at the desired point of union, and thereupon applying heat from an external source to the body of greater conductivity and to the face of the other body at points laterally contiguous to the portion of such face in contact with said first body, whereby such first body and such contacting face of the second body are brought to a welding temperature practically simultaneously, substantially as described.

2. The method of homogeneously uniting metal bodies having unlike characteristics as to fusibility, the more readily fusible body having also the greater heat conductivity, which consists in holding said bodies in contact at the desired point of union, and thereupon applying heat from an external source to the first, or more readily fusible, body and to the face of said second body at points laterally contiguous to the portion of such face in contact with said first body, whereby such first body and such contacting face of the second body are brought to a welding temperature practically simultaneously, substantially as described.

3. The method of homogeneously uniting metal bodies of unlike masses and different temperatures of fusion, the smaller mass having both the lower temperature of fusion and the greater heat conductivity; which consists in holding said bodies in contact at the desired point of union; and thereupon applying heat from an external source to the first, or more readily fusible, body and to the face of said second body at points laterally contiguous to the portion of such face in contact with said first body, whereby such first body and such contacting face of the second body are brought to a welding temperature practically simultaneously, substantially as described.

4. The method of homogeneously uniting metal bodies which consists in holding said bodies in contact at the desired point of union; directly heating one of said bodies and the face of the other body at points laterally contiguous to the portion of such face in contact with said first body, such heating being effected by pressing against said first body and such laterally contiguous points of said second body an electrode of high resistance, and thereupon passing a heating current through said electrode until a high temperature is produced in said electrode whereby said first body and such contacting face of the second body are brought to a welding temperature practically simultaneously, substantially as described.

5. The method of homogeneously uniting metal bodies having unlike characteristics as to fusibility, the more readily fusible body having also the greater heat conductivity; which consists in holding said bodies in contact at the desired point of union; directly heating the first or more readily fusible body and the face of said second body at points laterally contiguous to the portion of such face in contact with said first body, such heating being effected by pressing against said first body and such laterally contiguous points of said second body an electrode of high resistance, and thereupon passing a heating current through said electrode until a high temperature is produced in said electrode whereby said first body and such contacting face of the second body are brought to a welding temperature practically simultaneously, substantially as described.

6. The method of homogeneously uniting metal bodies of unlike masses and different temperatures of fusion, the smaller body having both the lower temperature of fusion and the greater heat conductivity; which consists in holding said bodies in contact at the desired point of union; and directly heating said smaller body and the face of said second body at points laterally contiguous to the portion of such face in contact with said first body by pressing against said first body and such laterally contiguous points of said second body an electrode of high resistance, and thereupon passing a heating electric current through said electrode until a high temperature is produced in said electrode, whereby said first body and such contacting face of the second body are brought to a welding temperature practically simultaneously, substantially as described.

7. The method of homogeneously uniting metal bodies having unlike characteristics as to fusibility, the more readily fusible body having also the greater heat conductivity; which consists in holding said bodies in contact at the desired point of union; directly heating the first or more readily fusible body and the face of said second body at points laterally contiguous to the portion of such face in contact with said first body, such heating being effected by pressing against said first body and such laterally contiguous points of said second body an electrode of high resistance, and thereupon passing a heating current through said electrode and bodies until a high temperature is produced in said electrode, whereby said first body and such contacting face of the second body are brought to a welding temperature practically simultaneously, substantially as described.

8. The method of homogeneously uniting metal bodies of unlike masses and different temperatures of fusion, the smaller body having both the lower temperature of fusion and the greater heat conductivity; which consists in holding said bodies in contact at the desired point of union; and directly heating said smaller body and the face of said second body at points laterally contiguous to the portion of such face in contact with said first body by pressing against said first body and such laterally contiguous points of said second body an electrode of high resistance, and thereupon passing a heating electric current through said electrode and bodies until a high temperature is produced in said electrode, whereby said first body and such contacting face of the second body are brought to a welding temperature practically simultaneously, substantially as described.

9. The method of homogeneously uniting a bond to a rail, which consists in holding the bond in contact with the rail at the desired point of union; and directly heating said bond and the face of said rail at points laterally contiguous to the portion of such face in contact with said bond by pressing against said bond and such laterally contiguous points of said rail an electrode of high resistance, and thereupon passing an electric current through said electrode bond and rail until a high temperature is produced in said electrode, whereby said bond and such contacting face of said rail are brought to a welding temperature practically simultaneously, substantially as described.

Signed by me this 27 day of May, 1909.

ALBERT B. HERRICK.

Attested by—
ARTHUR S. KOTTNER,
CLARENCE G. BOYDEN.